(12) United States Patent
Ajima et al.

(10) Patent No.: US 10,997,006 B2
(45) Date of Patent: May 4, 2021

(54) TRANSFER APPARATUS AND TRANSFER METHOD

(71) Applicant: FUJITSU LIMITED, Kawasaki (JP)

(72) Inventors: Yuichiro Ajima, Kawasaki (JP); Jouji Kunii, Kawasaki (JP); Souta Kusachi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 16/238,161

(22) Filed: Jan. 2, 2019

(65) Prior Publication Data

US 2019/0235947 A1 Aug. 1, 2019

(30) Foreign Application Priority Data

Feb. 1, 2018 (JP) .............................. JP2018-016691

(51) Int. Cl.
*G06F 11/07* (2006.01)
*H04L 1/00* (2006.01)
*G06F 11/10* (2006.01)

(52) U.S. Cl.
CPC ...... *G06F 11/0727* (2013.01); *G06F 11/0751* (2013.01); *G06F 11/0793* (2013.01); *G06F 11/1004* (2013.01); *H04L 1/00* (2013.01)

(58) Field of Classification Search
CPC ............. G06F 11/0727; G06F 11/1004; G06F 11/0751; G06F 11/0793; H04L 1/00; H04L 5/0044; H04L 2001/0096; H04L 1/0061; H04L 1/08
USPC .......................................................... 714/31
See application file for complete search history.

(56) References Cited

U.S. PATENT DOCUMENTS

| | | | | |
|---|---|---|---|---|
| 2002/0114283 | A1* | 8/2002 | Lee ....................... | H04L 1/1809 370/252 |
| 2003/0005387 | A1* | 1/2003 | Tsunoda ................ | H03M 13/00 714/785 |
| 2008/0010530 | A1 | 1/2008 | Davies et al. | |
| 2012/0144087 | A1 | 6/2012 | Buckland et al. | |
| 2013/0262948 | A1* | 10/2013 | Takehara ................ | G06F 11/08 714/747 |
| 2014/0233460 | A1* | 8/2014 | Pettus .................... | H01Q 13/06 370/328 |

(Continued)

FOREIGN PATENT DOCUMENTS

| | | |
|---|---|---|
| JP | 2009-540436 | 11/2009 |
| JP | 2012-118969 | 6/2012 |
| WO | 2007/146515 | 12/2007 |

OTHER PUBLICATIONS

Wikipedia "Multicast" page, retrieved from https://en.wikipedia.org/wiki/Multicast (Year: 2021).*

*Primary Examiner* — Yair Leibovich
(74) *Attorney, Agent, or Firm* — Fujitsu Patent Center

(57) ABSTRACT

A transfer apparatus for performing transmission and reception of data using a plurality of lanes includes: a transmission control unit configured to, upon receiving a transmission instruction for performing a data transfer in a redundant mode in which the same data is transferred using a plurality of lanes, output transmission data as first data and second data without renegotiation with another transfer apparatus; a first transmission unit configured to transmit the first data output by the transmission control unit via a first lane; and a second transmission unit configured to transmit the second data output by the transmission control unit via a second lane.

6 Claims, 7 Drawing Sheets

(56) References Cited

U.S. PATENT DOCUMENTS

2017/0078044 A1\* 3/2017 Hino .................... H04B 10/516

\* cited by examiner

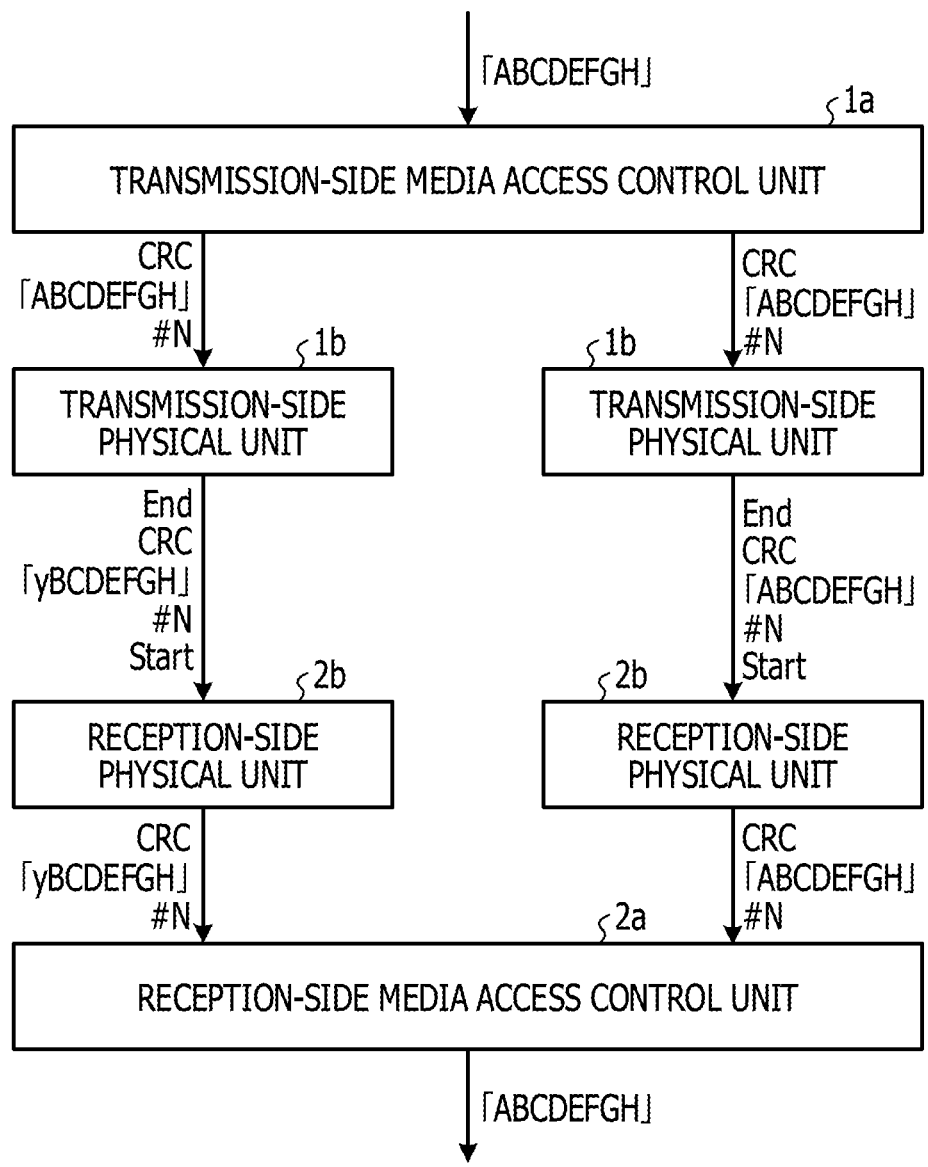

TRANSFER APPARATUS AND TRANSFER METHOD

CROSS-REFERENCE TO RELATED APPLICATION

This application is based upon and claims the benefit of priority of the prior Japanese Patent Application No. 2018-16691, filed on Feb. 1, 2018, the entire contents of which are incorporated herein by reference.

FIELD

Embodiments discussed herein are related to a transfer apparatus and a transfer method.

BACKGROUND

In recent years, a serial transmission method has been used for the interconnection between integrated circuits between which data transfer is performed. The serial transmission method is a method of superimposing a clock and data on each other in a single signal and transmitting the signal. A multi-lane serial transmission method in which a plurality of serial transmissions are set as a group realizes a wide frequency band.

In the multi-lane serial transmission, a transmission side distributes data among a plurality of lanes as bit strings. Each of the lanes transmits a bit string using a clock. A reception side reproduces a clock from a signal received from each lane and reads out a bit string from the received signal using the reproduced clock. In addition, the reception side corrects the skew of a transmission delay between lanes and restores original data from the bit strings in the lanes.

The distribution of data among a plurality of lanes and the restoration of data from the lanes are usually performed by a physical coding sublayer in a physical layer. A physical layer accommodates the difference between transmission media, so that an upper layer in the physical layer may perform multi-lane serial transmission without depending on the transmission media.

In the multi-lane serial transmission, for the increase in availability, negotiation regarding a transmission speed and a lane to be used is performed at the time of initialization. For the purpose of fault tolerance and power saving, a data transfer is temporarily suspended during operation and renegotiation is performed.

In a case where multi-lane serial transmission is performed under severe transmission conditions, an error rate in the multi-lane serial transmission increases under the influence of environmental conditions such as power supply quality and temperatures. An upper layer detects a generated error and corrects the error by retransmitting data. However, in a case where the error rate is high, the transfer of the data is not successfully performed even though retransmission is repeated. The upper layer diagnoses the unsuccessful data transfer as a failure in the serial transmission. Renegotiation is performed and the detection and isolation of a lane whose transmission quality has deteriorated are performed. As a result, the multi-lane serial transmission is continuously performed.

There is a serial attached SCSI (SAS) expander that isolates a fault by automatically detecting faulty communication in one of links and disabling a PHY connected to the link where the faulty communication has been detected.

There is a failover technique for, when detecting a fault in a first link that connects a first PCI bridge and a first IO device, using the unused portion of a second link that connects a second PCI bridge and a second IO device as an alternative to the first link.

Related arts are disclosed in Japanese National Publication of International Patent Application No. 2009-540436 and Japanese Laid-open Patent Publication No. 2012-118969.

SUMMARY

According to an aspect of the embodiments, a transfer apparatus for performing transmission and reception of data using a plurality of lanes includes: a transmission control unit configured to, upon receiving a transmission instruction for performing a data transfer in a redundant mode in which the same data is transferred using a plurality of lanes, output transmission data as first data and second data without renegotiation with another transfer apparatus; a first transmission unit configured to transmit the first data output by the transmission control unit via a first lane; and a second transmission unit configured to transmit the second data output by the transmission control unit via a second lane.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1C is a diagram describing a redundant mode.

DESCRIPTION OF EMBODIMENTS

A prior art for performing renegotiation to detect and isolate a lane whose transmission quality has deteriorated is useful when the transmission quality of a specific lane continuously deteriorates. However, in a situation where the transmission qualities of a plurality of lanes alternately deteriorate, a problem arises where time-consuming renegotiation is frequently performed and a data transfer is not performed during the renegotiation.

It is an object of the present disclosure to address the situation where the transmission qualities of a plurality of lanes alternately deteriorate without suspending a data transfer.

A transfer apparatus and a transfer method according to an embodiment of the present disclosure will be described in detail below with reference to the accompanying drawings. It is to be noted that the following embodiments do not limit the disclosed technique.

Embodiments

Figure 1A:
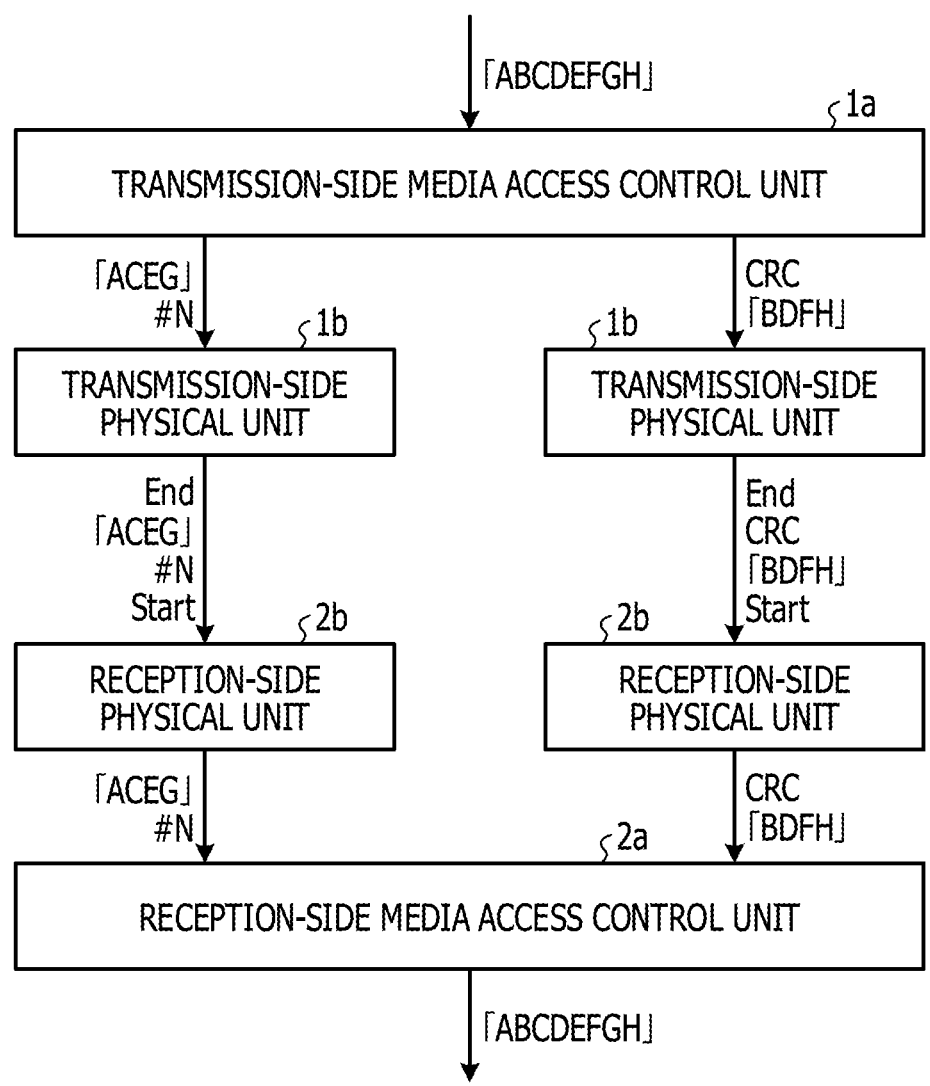
FIG. 1A is a diagram describing a distribution mode.
Figure 1B:
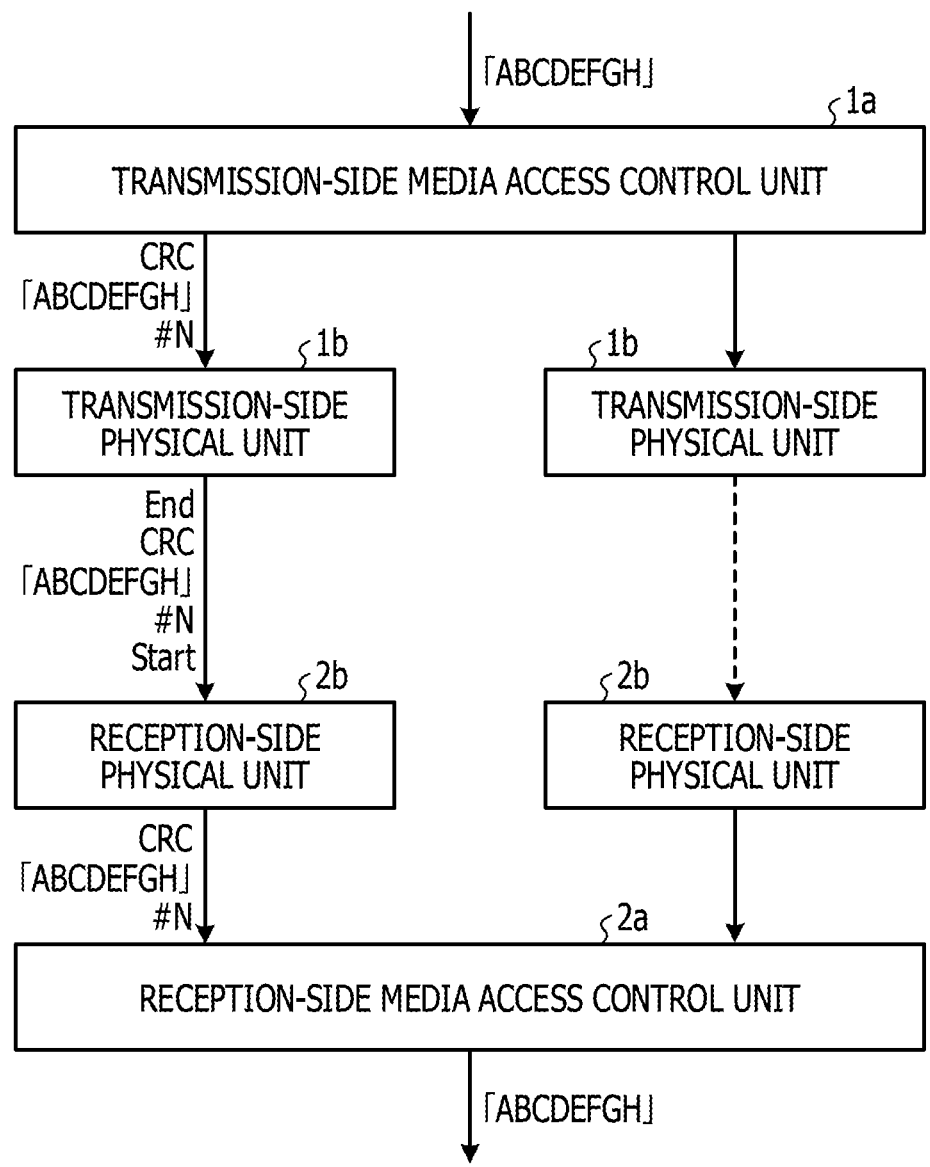
FIG. 1B is a diagram describing a nonredundant mode.

First, three transfer modes according to an embodiment will be described. The three transfer modes are a distribution mode, a nonredundant mode, and a redundant mode. FIG. 1A is a diagram describing the distribution mode. FIG. 1B is a diagram describing the nonredundant mode. FIG. 1C is a diagram describing the redundant mode. A case where the number of lanes is two will be described in embodiments. However, the number of lanes may be three or more. Examples of a multi-lane serial transmission include Ethernet (registered trademark), a universal serial bus (USB), and a peripheral component interconnect (PCI).

In the distribution mode, as illustrated in FIG. 1A, upon receiving transmission data "ABCDEFGH" input from an upper layer, a transmission-side media access control unit 1a adds #N and CRC to the transmission data and distributes the transmission data to respective lanes in units of characters. Here, #N represents the serial number of transmission data and CRC represents a cyclic redundancy check (CRC) code to be used for error detection. Referring to FIG. 1A, #N and "ACEG" are distributed to a left lane and "BDFH" and CRC are distributed to a right lane.

A transmission-side physical unit 1b in each lane adds an identification code (Start) to the head of the distributed data, adds an identification code (End) to the tail of the distributed data, and transmits the data to a serial transmission line as a bit string. A reception-side physical unit 2b in each lane recognizes identification codes in a received bit string and extracts distribution data.

A reception-side media access control unit 2a couples #N and "ACEG" received by the left lane and "BDFH" and CRC received by the right lane and checks #N and CRC. When #N indicates the serial number of data to be received next and there is no CRC error, the reception-side media access control unit 2a outputs the coupled received data "ABCDEFGH" to an upper layer.

In the nonredundant mode, as illustrated in FIG. 1B, data is transferred by only one of two lanes. Upon receiving transmission data "ABCDEFGH" input from an upper layer, the transmission-side media access control unit 1a adds #N and CRC to the transmission data and transmits the transmission data to the physical unit 1b in the left lane.

The transmission-side physical unit 1b in the left lane adds identification codes to the head and tail of the data and transmits the data to a serial transmission line as a bit string. It is assumed that the right lane has been determined to have bad transmission quality and has been isolated at the time of negotiation.

The reception-side physical unit 2b in the left lane recognizes identification codes from a received bit string, extracts #N, "ABCDEFGH", and CRC from the received bit string, and transmits them to the reception-side media access control unit 2a. The reception-side media access control unit 2a checks #N and CRC and outputs "ABCDEFGH" to an upper layer when #N indicates the serial number of data to be received next and there is no CRC error.

In the redundant mode, as illustrated in FIG. 1C, the same data is transferred to two lanes. Upon receiving transmission data "ABCDEFGH" input from an upper layer, the transmission-side media access control unit 1a adds #N and CRC to the transmission data and transmits the transmission data to both of the physical units 1b in the left and right lanes. Each of the physical units 1b in the left and right lanes adds identification codes to the head and tail of the data and transmits the data to a serial transmission line as a bit string.

Each of the physical units 2b in the left and right lanes recognizes identification codes from a received bit string, extracts #N, "ABCDEFGH", and CRC from the bit string, and transmits them to the reception-side media access control unit 2a. It is assumed that data in the left lane includes an error.

The reception-side media access control unit 2a performs a CRC check upon received data in the left lane, detects an error, and removes the error. In addition, the reception-side media access control unit 2a checks #N and CRC in received data in the right line, checks that #N indicates the serial number of data to be received next and there is no CRC error, and outputs data "ABCDEFGH" received by the right lane to an upper layer.

Thus, in the redundant mode, the reception-side media access control unit 2a outputs received data to an upper layer when an error is not found in any one of the left and right lanes. The switching from the distribution mode to the redundant mode is performed without renegotiation. Accordingly, in a data transfer according to an embodiment, the situation where the transmission qualities of the left and right lanes alternately deteriorate may be addressed without renegotiation.

Figure 2:
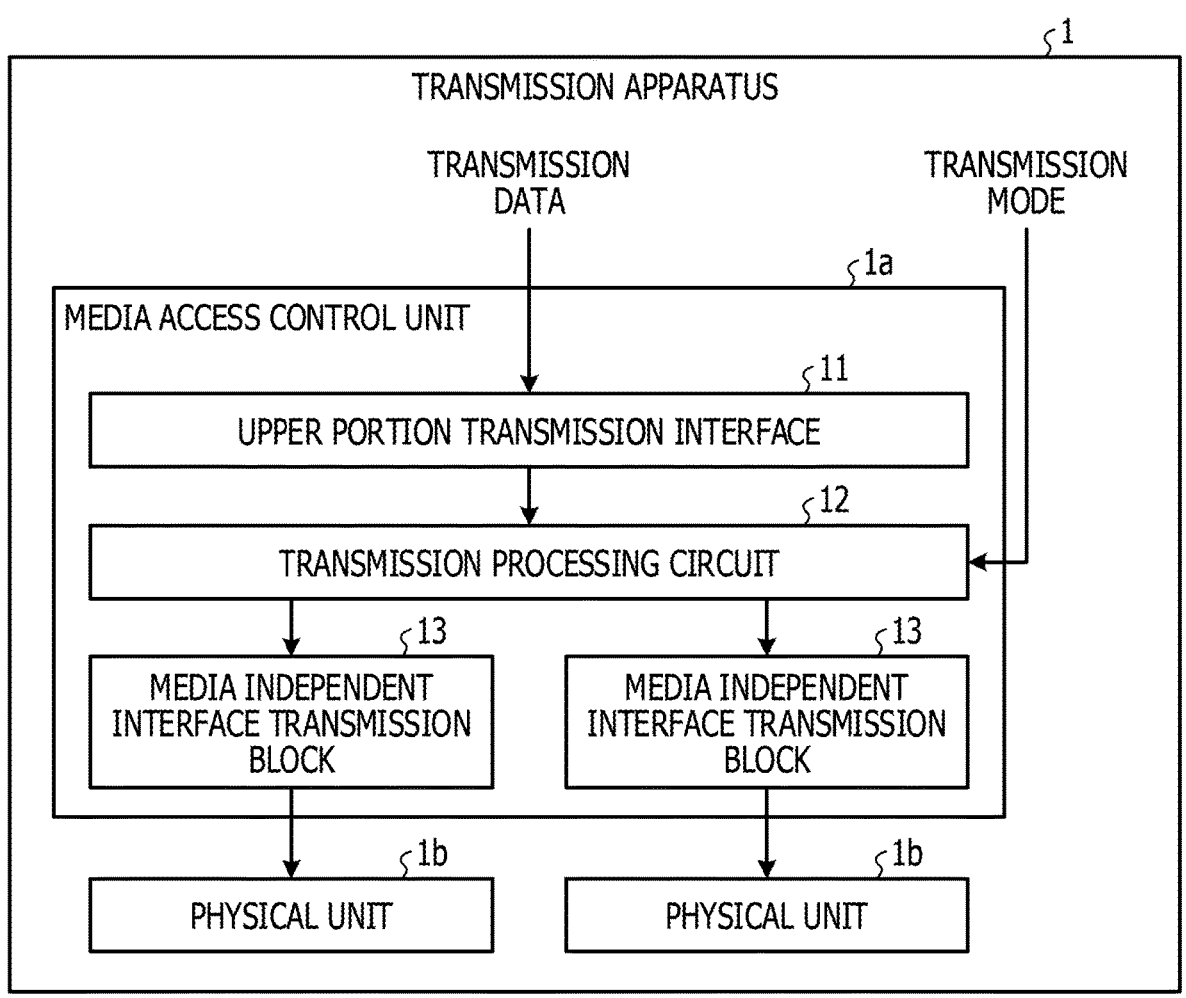
FIG. 2 is a functional block diagram of a media access control unit in a transmission apparatus according to an embodiment.
Figure 3:
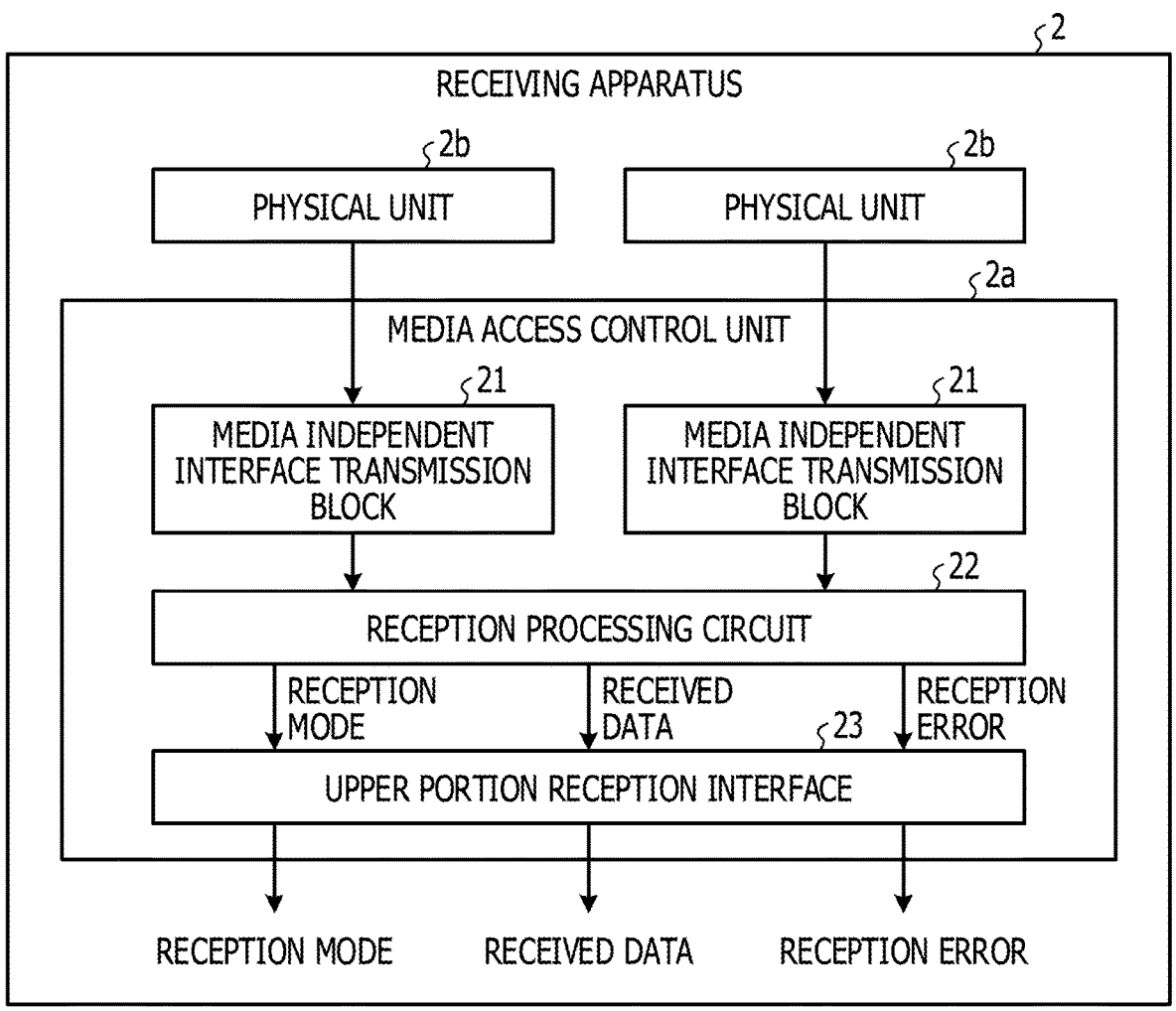
FIG. 3 is a functional block diagram of a media access control unit in a receiving apparatus according to an embodiment.

Next, the configuration of the media access control unit 1a in a transmission apparatus according to an embodiment and the configuration of the media access control unit 2a in a receiving apparatus according to an embodiment will be described. FIG. 2 is a functional block diagram of the media access control unit 1a in a transmission apparatus according to an embodiment. FIG. 3 is a functional block diagram of the media access control unit 2a in a receiving apparatus according to an embodiment.

As illustrated in FIG. 2, the media access control unit 1a in a transmission apparatus 1 includes an upper portion transmission interface 11, a transmission processing circuit 12, and two media independent interface transmission blocks 13.

The upper portion transmission interface 11 receives transmission data from the upper portion (upper layer) of the transmission apparatus 1 and transmits the transmission data to the transmission processing circuit 12.

The transmission processing circuit 12 transmits the transmission data to the two media independent interface transmission blocks 13 in a transmission mode (transfer mode) specified by the upper portion. In a case where the transmission mode specified by the upper portion is the distribution mode, the transmission processing circuit 12 distributes the transmission data between the two media independent interface transmission blocks 13. The transmission processing circuit 12 transmits a serial number to one of the media independent interface transmission blocks 13 and transmits CRC to the other one of the media independent interface transmission blocks 13.

In a case where the transmission mode specified by the upper portion is the nonredundant mode, the transmission processing circuit 12 transmits a serial number, transmission data, and CRC to the media independent interface transmission block 13 determined at the time of negotiation. In a case where the transmission mode specified by the upper portion is the redundant mode, the transmission processing circuit 12 transmits a serial number, transmission data, and CRC to both of the media independent interface transmission blocks 13.

For example, in a case where the transmission mode is the distribution mode, the transmission processing circuit 12 sets continuous values as serial numbers. In a case where the transmission mode is not the distribution mode, the transmission processing circuit 12 sets alternate values as serial numbers. In another example, the least significant bit of a serial number is used for the display of a transmission mode.

The media independent interface transmission block 13 adds identification codes to the head and tail of the data transmitted from the transmission processing circuit 12 and transmits the data to the corresponding physical unit 1b. The media independent interface transmission block 13 performs processing without depending on transmission media.

As illustrated in FIG. 3, the media access control unit 2a in a receiving apparatus 2 includes two media independent interface reception blocks 21, a reception processing circuit 22, and an upper portion reception interface 23.

The media independent interface reception block 21 receives data from the corresponding physical unit 2b and transmits the data to the reception processing circuit 22. The media independent interface reception block 21 performs processing without depending on transmission media.

The reception processing circuit 22 performs reception processing based on the reception statuses of the two media independent interface reception blocks 21 and transmits information about a reception mode (transfer mode), received data, and a reception error (in the event of a reception error) to the upper portion reception interface 23.

Specifically, in a case where the reception processing circuit 22 receives distribution data from the two media independent interface reception blocks 21, the reception processing circuit 22 performs restoration reception processing. That is, the reception processing circuit 22 couples #N and distribution data received from one of the media independent interface reception blocks 21 and distribution data and CRC received from the other one of the media independent interface reception blocks 21 and checks #N and CRC. The reception processing circuit 22 transmits the coupled distribution data to the upper portion reception interface 23 along with information indicating that the current mode is the distribution mode. In a case where the reception processing circuit 22 detects an error at the time of checking #N and CRC, the reception processing circuit 22 transmits a reception error to the upper portion reception interface 23.

The reception processing circuit 22 determines whether distribution data has been received based on, for example, whether serial numbers are continuous values or alternate values. In another example, the reception processing circuit 22 determines whether distribution data has been received based on the least significant bit of a serial number.

In a case where the reception processing circuit 22 receives data from only one of the media independent interface reception blocks 21, the reception processing circuit 22 performs nonredundant reception processing. That is, the reception processing circuit 22 performs an error check using #N and CRC included in data received from one of the media independent interface reception blocks 21. The reception processing circuit 22 removes #N and CRC from the data received from the media independent interface reception block 21 and transmits a remaining part of the data to the upper portion reception interface 23 as received data along with information indicating that the current mode is the nonredundant mode. In a case where the reception processing circuit 22 detects an error at the time of checking #N and CRC, the reception processing circuit 22 transmits a reception error to the upper portion reception interface 23.

In a case where the reception processing circuit 22 receives data other than distribution data from the two media independent interface reception block 21, the reception processing circuit 22 performs redundant reception processing. That is, the reception processing circuit 22 performs an error check using #N and CRC included in data received from each of the media independent interface reception blocks 21. In a case where at least one of the pieces of data received from the media independent interface reception blocks 21 include no error, the reception processing circuit 22 removes #N and CRC from the data including no error and transmits a remaining part of the data to the upper portion reception interface 23 as received data. At that time, the reception processing circuit 22 also transmits information indicating that the current mode is the redundant mode to the upper portion reception interface 23. In a case where the reception processing circuit 22 detects an error at the time of checking #N and CRC, the reception processing circuit 22 transmits a reception error to the upper portion reception interface 23.

In the redundant reception processing, when a case is continuously repeated predetermined times where an error is not detected in pieces of data received from the two media independent interface reception blocks 21, the reception processing circuit 22 requests the upper portion to change the mode from the redundant mode to the distribution mode.

The upper portion reception interface 23 transmits received data, information about the reception mode (the distribution mode, the nonredundant mode, or the redundant mode), and a reception error (in the event of a reception error in a check result) to the upper portion.

Figure 4:
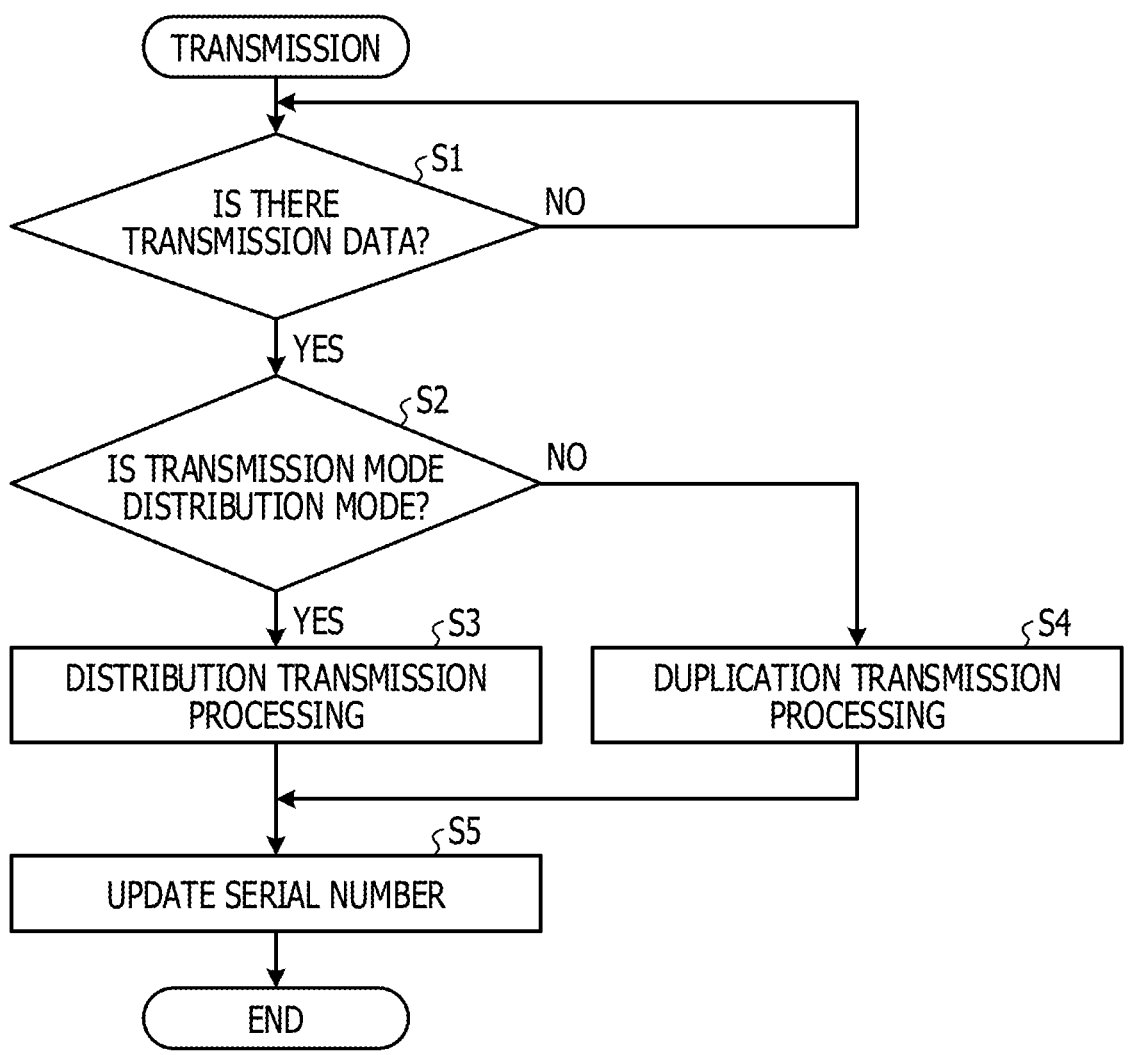
FIG. 4 is a flowchart illustrating a process performed by a media access control unit in a transmission apparatus.
Figure 5:
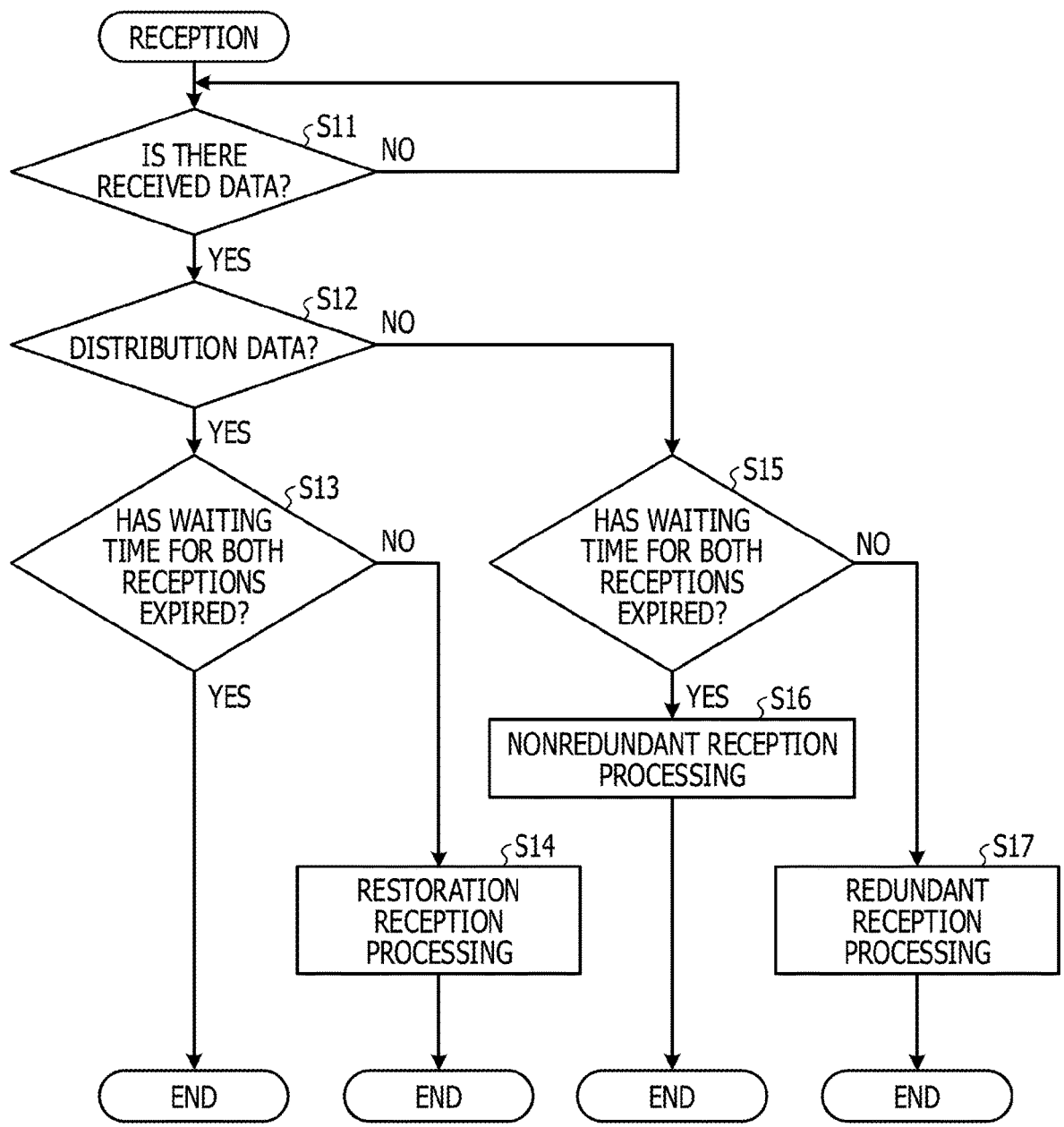
FIG. 5 is a flowchart illustrating a process performed by a media access control unit in a receiving apparatus.

Next, a process performed by the media access control unit 1a in the transmission apparatus 1 and a process performed by the media access control unit 2a in the receiving apparatus 2 will be described. FIG. 4 is a flowchart illustrating a process performed by the media access control unit 1a in the transmission apparatus 1. FIG. 5 is a flowchart illustrating a process performed by the media access control unit 2a in the receiving apparatus 2. FIG. 4 illustrates a process performed in a case where two lanes are available.

As illustrated in FIG. 4, the media access control unit 1a determines whether there is transmission data (step S1). The media access control unit 1a repeats the processing of step S1 until it determines that there is transmission data. When there is transmission data, the media access control unit 1a determines whether the transmission mode is the distribution mode (step S2). When the transmission mode is the distribution mode, the media access control unit 1a performs distribution transmission processing (step S3). The distribution transmission processing is processing for distributing transmission data between two lanes.

On the other hand, when the transmission mode is not the distribution mode, the media access control unit 1a performs duplication transmission processing (step S4). The duplication transmission processing is processing for transmitting transmission data using both lanes.

The media access control unit 1a performs a serial number updating (step S5). For example, in the case of the distribution mode, the serial number updating is performed by setting continuous values as serial numbers. In the case of a mode other than the distribution mode, the serial number updating is performed by setting alternate values as serial numbers.

Thus, since the media access control unit 1a performs the duplication transmission processing, a data transfer may be continuously performed even in a situation where the transmission qualities of two lanes alternately deteriorate.

As illustrated in FIG. 5, the media access control unit 2a determines whether there is received data (step S11). The media access control unit 2a repeats the processing of step S11 until it determines that there is received data. When there is received data, the media access control unit 2a determines whether the received data is distribution data (step S12). For example, the media access control unit 2a determines whether the received data is distribution data based on whether the serial numbers are continuous numbers or alternate numbers.

When the received data is distribution data, the media access control unit 2a determines whether a waiting time for both receptions has expired (step S13). When the waiting time for both receptions has expired, the media access control unit 2a ends the process. When the waiting time for both receptions has not expired, the media access control unit 2a performs restoration reception processing (step S14).

On the other hand, when the received data is not distribution data, the media access control unit 2a determines whether a waiting time for both receptions has expired (step S15). When the waiting time for both receptions has expired, the media access control unit 2a performs nonredundant reception processing (step S16). On the other hand, when the waiting time for both receptions has not expired, the media access control unit 2a performs redundant reception processing (step S17).

Thus, the media access control unit 2a specifies a transfer mode and performs reception processing based on the transfer mode. Accordingly, the transmission apparatus 1 may change a transfer mode at the time of transmitting data.

As described above, in an embodiment, upon receiving an instruction for transmitting data in the redundant mode, the media access control unit 1a in the transmission apparatus 1 transmits transmission data to the two physical units 1b without performing renegotiation with the receiving apparatus 2. The two physical units 1b transmit the transmission data using respective lanes. Accordingly, the suspension of a data transfer between the transmission apparatus 1 and the receiving apparatus 2 due to renegotiation may be suppressed. In addition, the situation where the transmission qualities of two lanes alternately deteriorate may be addressed.

In an embodiment, the reception processing circuit 22 performs redundant reception processing upon receiving data other than distribution data from the two media independent interface reception blocks 21. Accordingly, the situation where the transmission qualities of two lanes alternately deteriorate may be addressed.

In an embodiment, since the reception processing circuit 22 determines whether received data is distribution data based on whether serial numbers are continuous numbers or alternate numbers, the reception processing circuit 22 may specify a reception mode without renegotiation.

In an embodiment, when a case where is continuously repeated predetermined times where an error is not detected in pieces of data received from the two media independent interface reception blocks 21, the reception processing circuit 22 requests the upper portion to change the mode from the redundant mode to the distribution mode. Accordingly, the upper portion of the receiving apparatus 2 may request the upper portion of the transmission apparatus 1 to change the mode from the redundant mode to the distribution mode.

In an embodiment, the transmission apparatus 1 and the receiving apparatus 2 are provided as different apparatuses. However, the transmission apparatus 1 and the receiving apparatus 2 may be included in a single transfer apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transfer apparatus for performing transmission and reception of data using a multi-lane serial transmission technique, the transfer apparatus comprising:
   a transmission control circuit configured to:
      select any one of a plurality of transmission modes in response to detecting of a transmission instruction; and
      when the detected transmission instruction is a transmission instruction for performing a data transfer in a redundant mode of the multi-lane serial transmission technique, output transmission data as first data and second data without renegotiation with another transfer apparatus, the redundant mode being a mode in which data to be transferred through each of a plurality of lanes is same among the plurality of lanes, the first data being data same as the second data;
   a first transmission circuit configured to perform, by using a first lane from among the plurality of lanes, a serial transmission on the first data output by the transmission control circuit; and
   a second transmission circuit configured to perform, by using a second lane from among the plurality of lanes, a serial transmission on the second data output by the transmission control circuit.

2. The transfer apparatus according to claim 1, further comprising:
   a first reception circuit configured to receive, by using the first lane, third data transmitted from the other transfer apparatus;
   a second reception circuit configured to receive, by using the second lane, fourth data transmitted from the other transfer apparatus; and
   a reception control circuit configured to, in a case where it is determined that at least one of the third data and the fourth data include no error, perform redundant reception processing for outputting data including no error.

3. The transfer apparatus according to claim 2, wherein the reception control circuit is configured to perform the redundant reception processing in a case where the reception control circuit determines that a current mode is the redundant mode based on serial numbers included in the third data and the fourth data.

4. The transfer apparatus according to claim 2, wherein the reception control circuit is configured to, in a case where the reception control circuit continuously determines a predetermined number of times that neither of the third data and the fourth data includes an error, make a request for changing a mode from the redundant mode to a distribution mode in which data is distributed and transmitted.

5. A transfer method implemented by a transfer apparatus of performing transmission and reception of data using a multi-lane serial transmission technique, the transfer method comprising:
   select any one of a plurality of transmission modes in response to detecting of a transmission instruction;
   when the detected transmission instruction is a transmission instruction for performing a data transfer in a redundant mode of the multi-lane serial transmission technique, outputting transmission data as first data and second data without renegotiation with another transfer apparatus, the redundant mode being a mode in which data to be transferred through each of a plurality of lanes is same among the plurality of lanes, the first data being data same as the second data;

performing, by using a first lane from among the plurality of lanes, a serial transmission on the output first data; and performing, by using a second lane from among the plurality of lanes, a serial transmission on the output second data.

6. A transfer system for performing transmission and reception of data using a multi-lane serial transmission technique, the transfer system comprising:

a first transfer apparatus; and a second transfer apparatus, the first transfer apparatus includes:

a transmission control circuit configured to:

select any one of a plurality of transmission modes in response to detecting of a transmission instruction; and when the detected transmission instruction is a transmission instruction for performing a data transfer in a redundant mode of the multi-lane serial transmission technique, output transmission data as first data and second data without renegotiation with another transfer apparatus, the redundant mode being a mode in which data to be transferred through each of a plurality of lanes is same among the plurality of lanes, the first data being data same as the second data;

a first transmission circuit configured to perform, by using a first lane from among the plurality of lanes, a serial transmission on the first data output by the transmission control circuit; and a second transmission circuit configured to perform, by using a second lane from among the plurality of lanes, a serial transmission on the second data output by the transmission control circuit, and the second transfer apparatus includes:

a first reception circuit configured to receive, by using the first lane, third data transmitted from the other transfer apparatus;

a second reception circuit configured to receive, by using the second lane, fourth data transmitted from the other transfer apparatus; and a reception control circuit configured to, in a case where it is determined that at least one of the third data and the fourth data include no error, perform redundant reception processing for outputting data including no error.

* * * * *